US007564881B2

(12) United States Patent
Chang

(10) Patent No.: US 7,564,881 B2
(45) Date of Patent: Jul. 21, 2009

(54) OPTICAL TRANSMISSION MODULE WITH DIGITAL ADJUSTMENT AND THE ADJUSTING METHOD

(75) Inventor: Tianhai Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 10/898,910

(22) Filed: Jul. 26, 2004

(65) Prior Publication Data
US 2004/0264518 A1 Dec. 30, 2004

Related U.S. Application Data

(63) Continuation of application No. PCT/CN03/00093, filed on Jan. 28, 2003.

(30) Foreign Application Priority Data

Jan. 30, 2002 (CN) ................. 02 1 00446

(51) Int. Cl.
*H01S 3/13* (2006.01)
*H01S 3/00* (2006.01)
*H01S 3/04* (2006.01)

(52) U.S. Cl. ............ 372/29.02; 372/29.01; 372/29.011; 372/29.012; 372/29.021; 372/29.013; 372/29.014; 372/29.015; 372/31; 372/32; 372/33; 372/34; 372/38.1; 372/38.01; 372/38.02; 372/38.04; 372/38.07; 372/38.09

(58) Field of Classification Search ............ 372/29.02, 372/29.021, 33, 34, 38.02, 38.04, 29.01, 372/29.011, 29.012, 29.013, 29.014, 29.015, 372/31, 32, 38.07, 38.09
See application file for complete search history.

(56) References Cited

U.S. PATENT DOCUMENTS 5,019,769 A 5/1991 Levinson
6,195,371 B1 2/2001 Haneda et al.

FOREIGN PATENT DOCUMENTS

CN 1142714 A 2/1997

*Primary Examiner*—Kenneth A Parker
*Assistant Examiner*—Hrayr A. Sayadian

(57) ABSTRACT

The invention discloses an optical transmission module with digital adjustment and method thereof. The module includes a laser (21), a laser driver (22), an automatic power adjustment circuit (23), an automatic temperature adjustment circuit (24), a digital adjustment circuit (25) and a memory (26). The digital adjustment circuit, consisted of a digital-to-analog converter or a digital adjustment potentiometer, receives a digital adjustment signal and outputs, respectively, a extinction ratio adjustment signal and a cross point adjustment signal to the laser driver, an optical power adjustment signal to the automatic power adjustment circuit and an optical wavelength adjustment signal to the automatic temperature adjustment circuit. The memory stores data, using for on-line adjustment of the optical transmission module, at least including parameters of said optical transmission module and said laser emitting optical power parameters, to be reported upward. During adjustment, look up the parameter table of optical transmission modules, according to an expected output optical power, obtain corresponding DAC channel data and write it to the digital adjustment circuit in which adjustment signals of corresponding parameters are produced; and according to A/D conversion result detected by the laser against light, look up the table for transmitted power to be reported upward, to obtain a transmitted power value for reporting upward.

9 Claims, 7 Drawing Sheets

OPTICAL TRANSMISSION MODULE WITH DIGITAL ADJUSTMENT AND THE ADJUSTING METHOD

CROSS-REFERENCE TO RELATED APPLICATIONS

This application is a continuation of International Application No. PCT/CN03/00093 filed on Jan. 28, 2003. This application claims the benefit of Chinese Application No. 02100446.3 filed on Jan. 30, 2002. The disclosures of the above applications are incorporated herein by reference.

FIELD OF THE INVENTION

The present invention generally relates to electro-optical converter technique in an optical communication system, more especially to a digital adjustment method for optical transmission module and its parameters.

BACKGROUND OF THE INVENTION

In an optical communication system, an optical transmission module converts an electrical signal to an optical signal, and its performance affects the system performance directly. Therefore, an optical transmission module is important in the system. Conventionally, an optical transmission module with analog adjustment is shown in FIG. 1.

In FIG. 1, the optical transmission module is mainly consisted of four parts: a laser 11, which performs electro-optical conversion; a laser driver 12, which makes impedance match, drives the laser and sets parameters; an automatic power control (APC) circuit 13, which makes power of the transmitted signal stable; and an automatic temperature control (ATC) circuit 14, which makes temperature of the laser stable to guarantee a stable optical wavelength.

Input signals of an optical transmission module include a differential clock signal and a differential data signal, which are inputted to the laser driver 12, the laser shutdown signal, which is inputted to the APC circuit 13. The signals for reporting upward performance of an optical transmission module, include the laser refrigerating current outputted from ATC circuit 14; the average power of a transmitted optical signal outputted from APC circuit 13, and the laser bias current.

Parameters of the optical transmission module are adjusted mainly through potentiometers. Extinction ratio and cross point of the laser is adjusted by the potentiometers R1 and R2 through the laser driver 12. The optical wavelength trimming signal of the optical transmission module is adjusted by the potentiometer R3 through ATC circuit 14. The optical power of the optical transmission module is adjusted by the potentiometer R4 through APC circuit 13.

There are also other additional circuits, such as a laser shutdown circuit, a power supply etc. Since they are no relation with the invention, so they have not been drawn here.

Advantages of the optical transmission module with analog adjustment are mature technically, and are popularly used by communication device vendors; but there are disadvantages:

(1) Accuracy and stability of parameters of the optical transmitter depends on accuracy and stability of the potentiometers, and a potentiometer changes its resistance by changing the slider position, which is a mechanical device. Since contacts of a mechanical potentiometer have problems of contact fault, temperature drift and contact moving etc., drift of potentiometer parameters is unavoidable.

(2) adjustment of a potentiometer is complicated so that it is difficult for an optical transmission module to be implemented automatic production and production cost will be higher during manufacture. In addition, performance of an optical transmission module depends on skills of workers, so it is difficult to guarantee performance consistency of products.

(3) It is difficult to create a product database for parameters of adjustment and testing of optical transmission module products. The product database is very important for ameliorating performance of optical transmission module.

(4) During application, parameters of an optical transmission module will be drift along with increasing of service time. It is necessary to adjust parameters of an optical transmitter without interrupting its service, but this is impossible for a device adjusted by potentiometers.

In recent years, along with the development of digital technique many analog techniques are replaced by digital techniques. The invention intends to implement digital adjustment of parameters of an optical transmission module.

SUMMARY OF THE INVENTION

Objective of the invention is to design an optical transmission module with digital adjustment and an adjusting method thereof. When parameters of an optical transmission module are adjusted by digital technique, the module production can be automatic easily, production efficiency can be raised and cost can be decreased, also, parameters can be adjusted without interrupting service, for example, adjusting optical power online.

The technical scheme of the invention is as follow.

An optical transmission module with digital adjustment includes a laser (21), a laser driver (22), an automatic power control circuit (23) and an automatic temperature control circuit (24), wherein the optical transmission module further includes:

a digital adjustment circuit (25) and a memory (26);

the digital adjustment circuit (25) is inputted a adjustment signal from a digital interface, and outputs respectively, a laser extinction ratio adjustment signal and a laser cross point adjustment signal to the laser driver (22), a laser optical wavelength trimming signal to the automatic temperature control circuit (24) and a laser optical power adjustment signal to the automatic power control circuit (23);

the memory (26) stores data which at least includes parameters of the optical transmission module and the laser emitting optical power parameters to be reported upward, for on-line adjustment of the optical transmission module.

The digital adjustment circuit is a digital-to-analog converter (DAC), wherein the digital-to-analog converter comprises a serial digital-to-analog converter circuit connected with a level converter.

The digital adjustment circuit is a digital adjustment potentiometer, wherein the digital adjustment potentiometer comprises a resistance array, a multi-channel selection switch and a level converter, which are connected in sequence.

The laser is a direct adjustment laser with refrigerating silicon.

The technical scheme of the invention further includes a digital adjust method for an optical transmission module, comprising:

A. setting a memory to store a parameter table of the optical transmission module, a table for upward reporting laser transmission optical power, and information of optical transmission modules;

B. setting a digital adjustment circuit consisted of a digital-to-analog converter (DAC) at least;

C. looking up the parameter table of the optical transmission module in the memory to obtain DAC channel data, according to an expected transmitter optical power; writing to the digital adjustment circuit;

through the digital adjustment circuit, outputting analog signals for laser extinction ratio adjustment, laser cross point adjustment, laser optical power adjustment and laser optical wavelength trimming;

D. detecting transmitted power of the optical transmission module by against light and converting it to a digital signal;

E. looking up the table for upward reporting laser emitting optical power in said memory according to the digital signal and obtaining a laser emitting optical power value for reporting upward.

Said obtaining DAC channel data comprises: obtaining the DAC channel data through linear interpolation based on the parameter table of the optical transmission module;

said obtaining a value of laser emitting optical power comprises: obtaining the value of laser transmitted power through linear interpolation based on the table of laser transmission optical power.

For the parameter table of the optical transmission module, further comprises, taking a preset transmitted optical power as an index item, setting other items corresponding DAC channel data of the transmitted optical power including, DAC channel data of a optical power, the DAC channel data of a extinction ratio, DAC channel data of a cross point and DAC channel data of a optical wavelength.

For the preset transmitted optical power in the parameter table of the optical transmission module, further comprises, setting range of the preset transmitted optical power, which is an index item of the parameter table, from −3.0 dBm to +3.0 dBm with 0.5 dBm space.

Creation of the parameter table of the optical transmission module further comprises:

A1. under a selected first and second laser transmission optical power, adjusting and testing laser parameters of the optical transmission module until that its extinction ratio, cross point and optical wavelength satisfy standards; and then recording first group data and second group data, respectively; wherein each group data including DAC channel data of a optical power, DAC channel data of a extinction ratio, DAC channel data of a cross point and DAC channel data of an optical wavelength;

B1. taking the laser emitting optical power as abscissa of a coordinate system, and taking, respectively, DAC channel data of the optical power, DAC channel data of the extinction ratio, DAC channel data of the cross point and DAC channel data of the optical wavelength as ordinate of the coordinate system; respectively identifying data of the first and second group on corresponding coordinate system according to parameter types, and connecting two points with a linear line on each coordinate system, and then obtaining curves of functions being drawn; wherein functions includes optical power DAC channel data function of the laser transmission optical power, extinction ratio DAC channel data function of the laser transmission optical power, cross point DAC channel data function of the laser emitting optical power and optical wavelength DAC channel data function of the laser transmission optical power;

C1. obtaining the parameter table of the optical transmission module by taking fixed space of the laser emitting optical power on the curves.

The table for upward reporting laser transmission optical power, is a table of corresponding analog-to-digital (ADC) channel data function of the laser transmission optical power; and range of the said transmitted power is set from −3.0 dBm to +3.0 dBm with 0.5 dBm space.

Creation of the table for upward reporting laser transmission optical power, further comprises:

A2. under a selected first and second of laser transmission optical power, adjusting and testing upward reporting value of laser emitting optical power in the optical transmission module, respectively; recording corresponding first and second ADC data, respectively;

B2. taking the laser emitting optical power as abscissa and the ADC data of the laser emitting optical power as ordinate of a coordinate system;

identifying first and second ADC data on the coordinate system connecting the said two points with a linear line, and then obtaining a curve of the ADC data function of the laser transmission optical power;

C2. obtaining the table for upward reporting laser emitting optical power by taking fixed space of said transmitted power on curve said above.

Comparing with the conventional analog optical transmission module, the invention mainly changes the adjustment mode, and the basic circuits of an optical transmission module are kept unchanged. The invention adds memory to the module and substitutes the analog potentiometer with a digital adjustment circuit. The memory is used to store parameters of the optical transmission module, and the digital adjustment circuit is used to adjust a working point of the laser.

Although, implementation of the invention will increase software overhead, comparing with the optical transmission module with analog adjustment by the potentiometers, the invention has the following advantages:

(1) when a working point of the laser is set and adjusted by a DAC device, there is no any mechanical contact, so the optical transmission module with digital adjustment is more reliable, stable and has longer service life;

(2) when the optical transmission module parameters are adjusted by a digital potentiometer, it is implemented by software, so it is easier to implement automatic production, to raise production efficiency and to decrease production cost;

(3) by creating a product parameter database with the present IT platform, it is easier to guarantee product quality and possible to trace products;

(4) since optical transmission module production is automatic, skills of workers on which module quality depends is decreased, so product quality can be raised and production cost can be decreased;

(5) through a network management system, parameters of a optical transmission module can be adjusted on line, this will extend its life and decrease affection for service during maintenance;

(6) A optical transmission module with digital adjustment has better performance, and its EEPROM memory stores parameters of the module in a table; with linear interpolation its transmission optical power can be changed easily, so efficiency of adjustment and test applied in a system is raised; nevertheless, for an adjusted and tested analog adjust optical transmission module, when it is applied in a system and a transmitted power does not satisfy requirement because of difference between the preset transmitted power and the required transmitted power in a system, usually a melt method is used to decrease the transmitted power until the transmitted power reaches a suitable value, which will decrease a system reliability.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Reference to drawings, the invention will be described in more detail.

Figure 1:
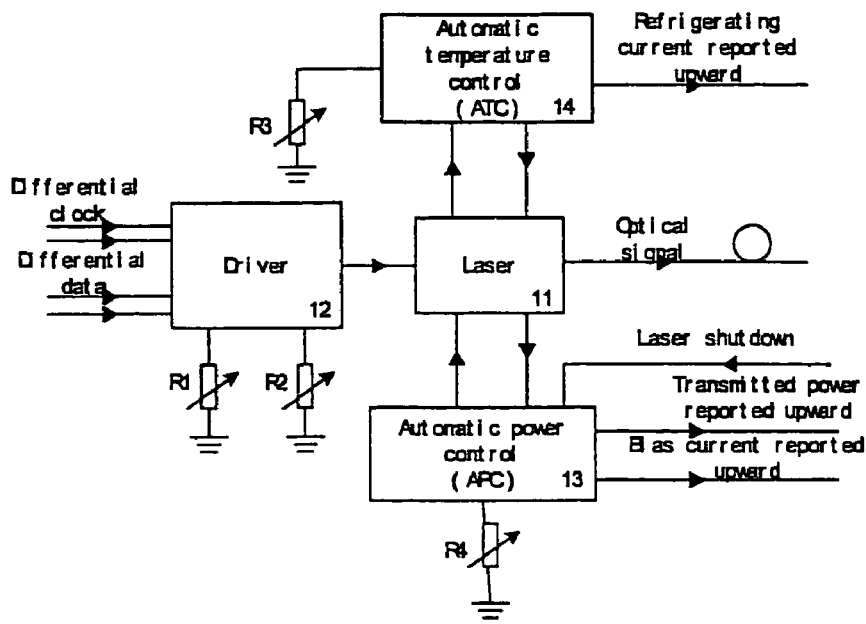
FIG. 1 shows a diagram of a conventional optical transmission module with analog adjustment.
Figure 2:
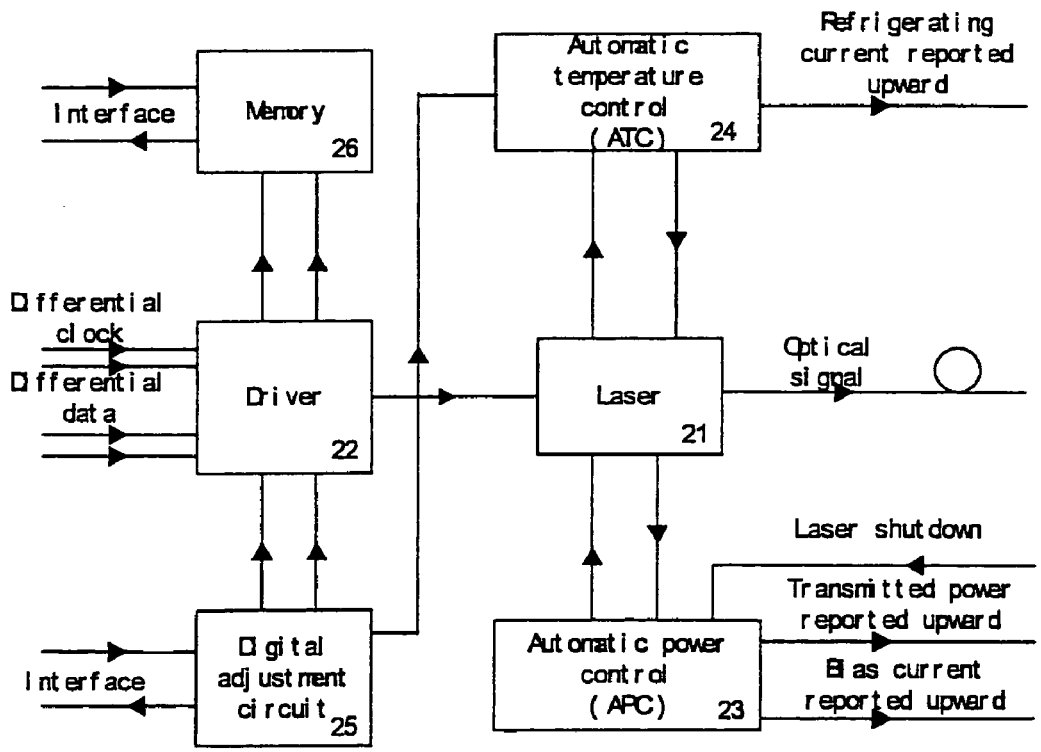
FIG. 2 shows a diagram of an optical transmission module with digital adjustment.

FIG. 2 shows a diagram of an optical transmission module with digital adjustment. Comparing with FIG. 1 shown a diagram of an optical transmission module with analog adjustment, the similar parts include the laser 21, which performs electro-optical conversion; the laser driver 22, which makes impedance match, drives the laser and sets parameters; the automatic power control (APC) circuit 23, which makes the transmitted power stable; and the automatic temperature control (ATC) circuit 24, which makes temperature of the laser stable to guarantee a stable optical wavelength. Input signals of an optical transmission module include the differential clock signal and the differential data signal, which are inputted to the laser driver 22, the laser shutdown signal, which is inputted to the APC circuit 23. The optical signals are outputted by the laser. The signals for reporting upward performance of an optical transmission module, include the laser refrigerating current outputted from ATC circuit 14; the average power of a transmitted optical signal outputted from APC circuit 13, and the laser bias current.

The digital adjustment circuit 25 and memory 26 are parts that are newly added for the invention. The digital adjustment circuit 25 respectively sends adjustment signals of extinction ratio and cross point to the laser driver 22, optical wavelength trimming signal to ATC circuit 24 and optical power adjustment signal to APC circuit, which are performed by potentiometers R1 to R4 in FIG. 1.

In the following, the digital adjustment circuit 25, the memory 26 and their adjusting method will be further described.

Figure 3:
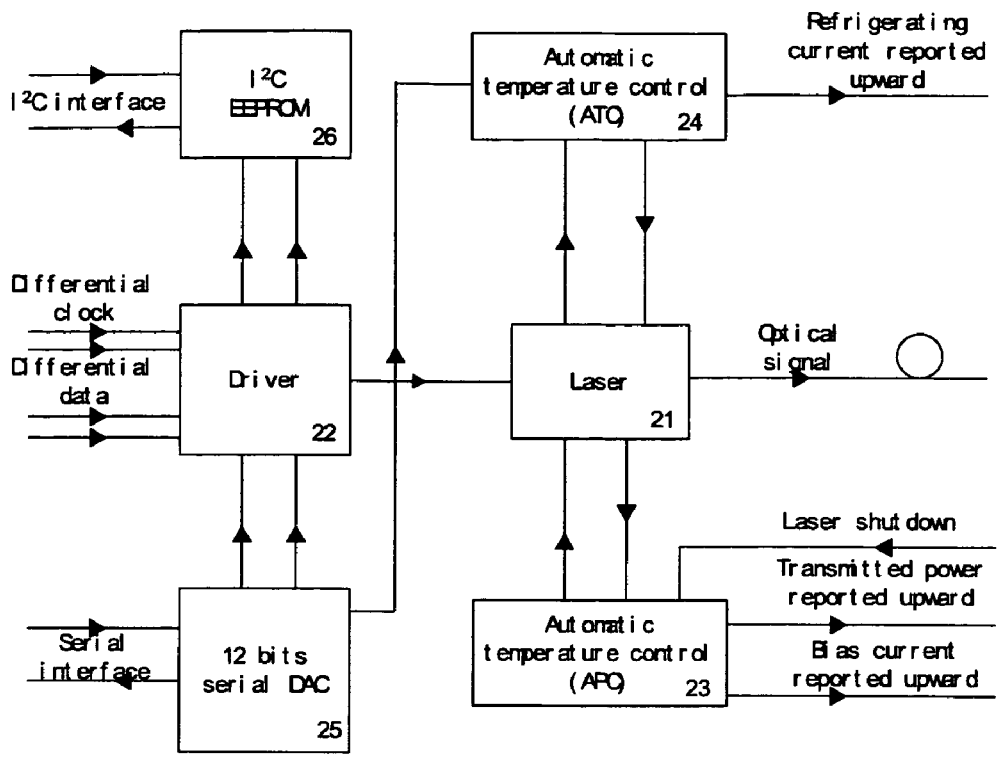
FIG. 3 shows a diagram of an optical transmission module by taking a DAC device as the digital adjustment circuit.
Figure 5:
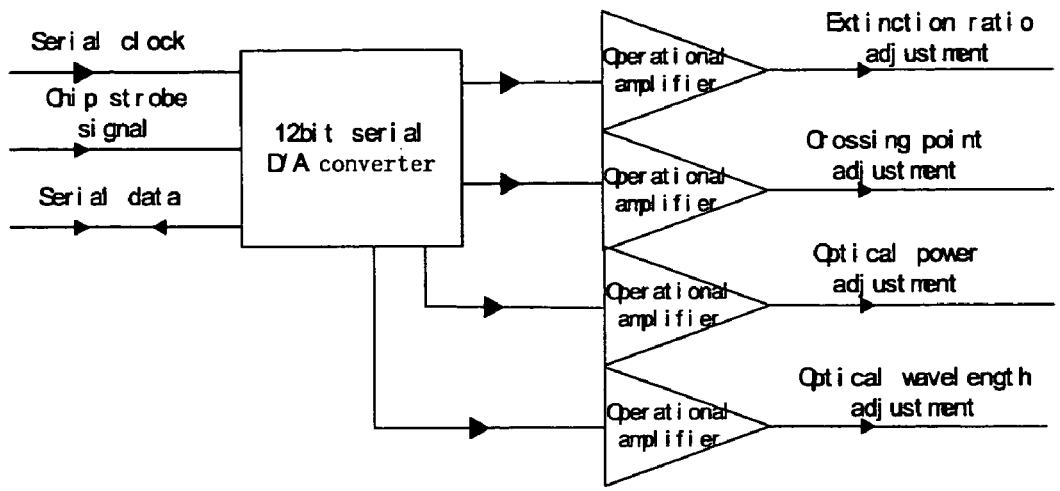
FIG. 5 shows a circuit diagram taking DAC device as the digital adjustment circuit as shown in FIG. 3.

Reference to FIG. 3 and FIG. 5 and compare FIG. 3 with FIG. 2, FIG. 3 shows the devices of the memory 26 and the digital adjustment circuit 25. The memory 26 applies I²C EEPROM (Electrically Erasable Programmable Read Only Memory) with 24C64 I²C interface, which has great storages and simple interfaces, and is used for storing parameters of the optical transmission modules. The digital adjustment circuit 25 applies digital-to-analog converter (DAC) device that is consisted of 12 bits serial D/A converter connecting with four operational amplifiers. The input signals of wherein 12 bits serial D/A converter are a serial clock signal, a chip strobe signal and the serial data, and wherein 12 bits serial D/A converter outputs four analog signals, which are converted levels respectively by the four operational amplifiers to form a extinction ratio adjustment signal, a cross point adjustment signal, an optical power adjustment signal and an optical wavelength trimming signal.

DAC device is a digital-to-analog converter. The output voltage of a 12 bits DAC satisfies the following formula:

$$V_o = \frac{V_{REF} \times \text{Data}}{2^N},$$

Wherein $V_0$ is the analog output voltage, $V_{REF}$ is the reference voltage, Data are the digital input of DAC device and N is the number of bits of the DAC device.

Figure 4:
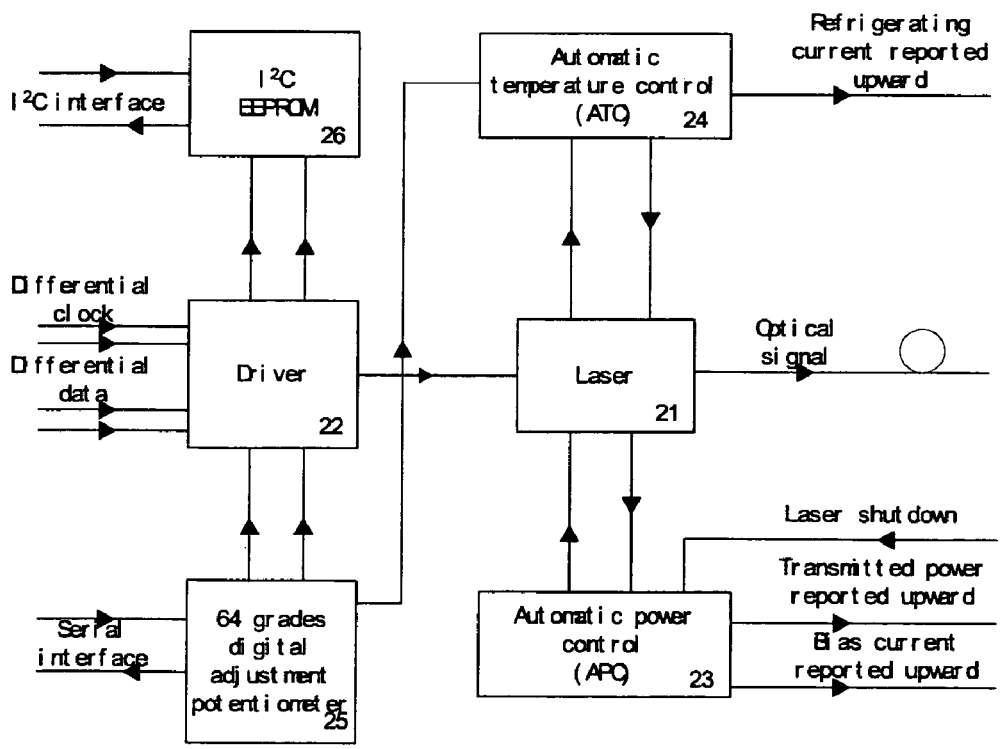
FIG. 4 shows a diagram of an optical transmission module by taking a digital adjustment potentiometer as the digital adjustment circuit.
Figure 6:
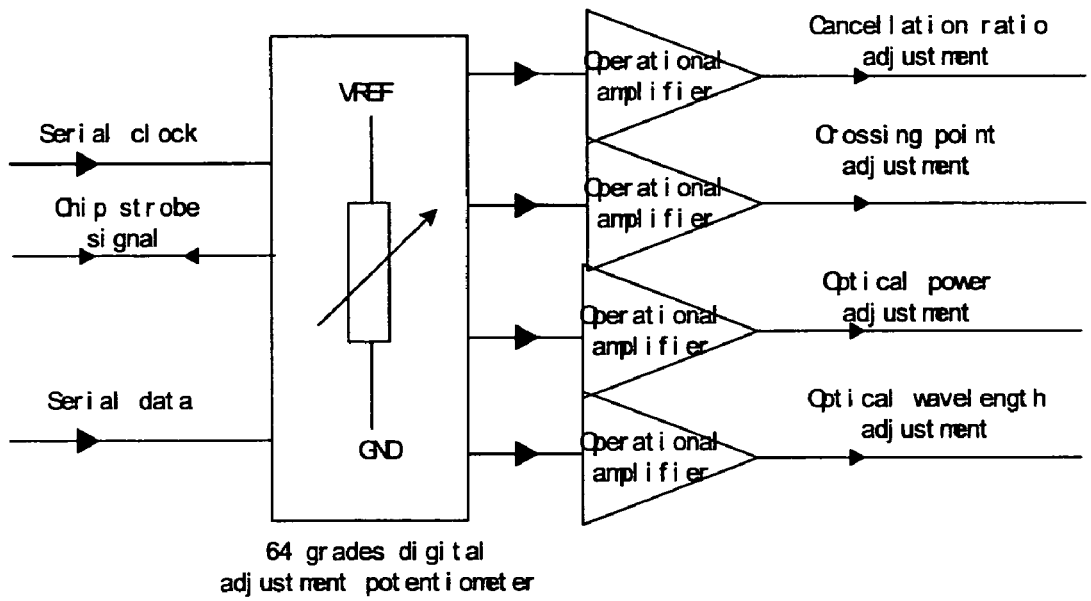
FIG. 6 shows a circuit diagram taking a digital adjustment potentiometer as the digital adjust circuit as shown in FIG. 4.

Reference to FIG. 4 and FIG. 6 and compare FIG. 4 with FIG. 2, FIG. 4 shows the memory 26 and the digital adjustment circuit 25. The memory 26 applies I²C EEPROM with 24C64 I²C interface, which has great storages and simple interfaces, and is used for storing parameters of the optical transmission modules. The digital adjustment circuit 25 applies digital adjustment potentiometer that is consisted of 64 grades potentiometer connecting with four operational amplifiers. The input signals of the 64 grades potentiometer are a serial clock signal, a chip strobe signal and the serial data, and the 64 grades potentiometer outputs four analog signals, which are converted levels respectively by the four operational amplifiers to form: a extinction ratio adjustment signal, a cross point adjustment signal, an optical power adjustment signal and an optical wavelength trimming signal.

Figure 7:
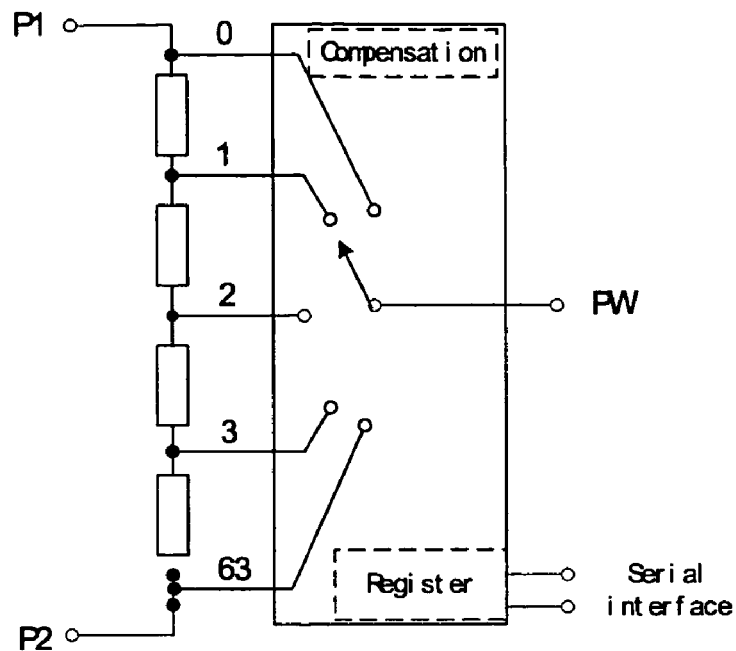
FIG. 7 shows a circuit diagram of a digital adjustment potentiometer as shown in FIG. 6.

Reference to FIG. 7, the digital adjustment potentiometer is consisted of connecting a resistance array with a multi-channel selection analog switch (64 channels). The resistance array is consisted of the first to sixty-third resistances that are serially connected between P1 and P2. By writing different data to the register of the multi-channel selection analog switch, different analog switch is connected to the output PW, so output voltage can be changed. This is similar to the moving of the slider of a mechanical potentiometer.

Two embodiments of the digital adjustment circuit that is kernel of an optical transmission module are shown in FIG. 3 to FIG. 7. First embodiment applies DAC device for the digital adjustment circuit and takes DAC mode. Second embodiment applies digital adjustment potentiometer for the digital adjustment circuit and takes digital potentiometer mode. Both embodiments all apply a memory.

In both embodiments, four operational amplifiers implement level conversion and impedance isolation. The output voltage range of a digital adjustment potentiometer or a DAC device is 0 to $V_{ref}$ (reference voltage). When using different laser drivers, the adjusted voltage ranges of optical transmission module are different. In practice, the adjustment signal range of extinction ratio, cross point and optical power is 0 to −4V, and the range of the optical wavelength trimming signal is 2 to −2V. These different ranges of adjustment voltages can be obtained by level conversion in the four operation amplifiers. Furthermore, output impedance of a DAC device or a digital adjustment potentiometer is larger, so load capability is worse. In the embodiments, with high input impedance of the operational amplifiers, impedance isolation between an adjusted chip and a digital adjustment potentiometer or a DAC device can be implemented.

In the embodiments, data of an optical transmission module, which are stored in the EEPROM, includes: a parameter table of optical transmission modules, a table for upward reporting transmission optical power of lasers and information of modules. Among them, the parameter table is a basis for on-line optical power adjustment. Taking a DAC device as a digital adjustment circuit, the parameter table of an optical transmission module is described in the following.

The parameter table of an optical transmission module is shown in Table 1. The index item is a preset transmitted power taking dBm as a unit, and its range is from −3.0 to +3.0 with a space of 0.5 dBm (stored data are two's complement represented by a hex). Other items are optical power data, extinction ratio data, cross point data and optical wavelength data, and they are all represented by two bytes of a hex that will be written to DAC device corresponding channels.

TABLE 1

| Index item (dBm) | Optical power data | Extinction ratio data | Cross point data | Optical wavelength data |
|---|---|---|---|---|
| −3.0 | 020E | 0A70 | 05A5 | 0435 |
| −2.5 | 0248 | 0A3F | 05B1 | 0436 |
| −2.0 | 0288 | 0A08 | 05BE | 0437 |
| −1.5 | 02D1 | 09CA | 05CC | 0439 |
| −1.0 | 0323 | 0985 | 05DD | 043A |
| −0.5 | 037E | 0937 | 05EF | 043C |
| 0.0 | 03E5 | 08DF | 0604 | 043E |
| 0.5 | 0458 | 087D | 061B | 0440 |
| 1.0 | 04DA | 080F | 0635 | 0442 |
| 1.5 | 056B | 0794 | 0652 | 0445 |
| 2.0 | 060E | 0709 | 0673 | 0447 |
| 2.5 | 06C5 | 066D | 0698 | 044B |
| 3.0 | 0792 | 05BF | 06C1 | 044E |

Since extinction ratio data, optical power data, cross point data and optical wavelength data are linear function of its adjustment voltage, so when adjusting and testing an optical transmission module, only two points are needed to obtain the laser parameters. By obtaining parameters of a laser at these two points, parameters of a laser in the whole range of output optical power can be obtained. Limited by computing overhead and storage, in this invention every 0.5 dBm is a space for storing data in the EEPROM. When reading out, software can obtain parameters of a laser at any transmitted optical power by looking for the table and calculating with linear interpolation.

Figure 8:
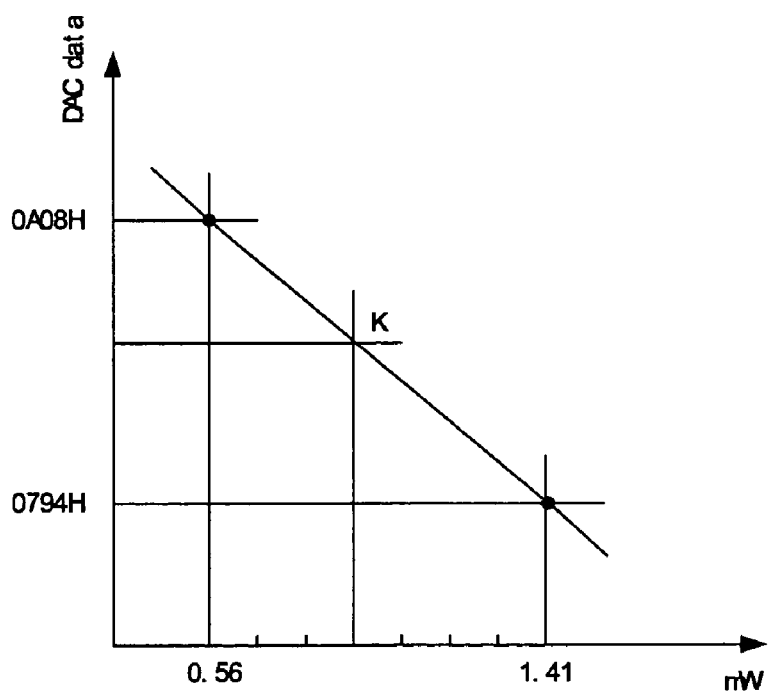
FIG. 8 is a diagram showing how a parameter table is created in the invention.

Reference to FIG. 8, creation of the parameters table of an optical transmission module is further described.

First step, when the laser emitting optical power is at about −2 dBm, adjust and test parameters of the optical transmission module so that the extinction ratio, the cross point and the optical wavelength satisfy the ITU-T standards; and then record a group of data: a transmitted optical power (Power 1), DAC channel data of an optical power (DAC-Power 1), DAC channel data of a extinction ratio, DAC channel data of a cross point (DAC-Cross 1) and DAC channel data of an optical wavelength (DAC-Wave 1).

Second step, change the laser emitting optical power to about +1.0 dBm, do the same adjusting and testing as step 1 and record the second group of data: Power 2, DAC-Power 2, DAC channel data of a extinction ratio, DAC-Cross 2 and DAC-Wave 2.

Third step, since every adjusted and tested parameter are linear function of the transmitted optical power (dBm unit is transformed to mW unit here), connect these two points, obtained at step 1 and step 2 respectively, with a linear line, curves of DAC-Optical Power function, DAC-Extinction Ratio function, DAC-Cross Point function and DAC-Optical wavelength function are drawn, respectively.

FIG. 8 shows a curve of DAC-Extinction Ratio function of the transmitted optical power. The two points are [0.56 mW (−2.0 dBm), 0A08H] and [1.41 mW (1.5 dBm), 0794H]. From this curve, DAC-Extinction Ratio data of every expected transmitted optical power can be obtained. Similarly, a curve of DAC-Optical Power function of the transmitted optical power, a curve of DAC-Cross function of the transmitted optical power, a curve of DAC-Optical wavelength function of the transmitted optical power can be obtained. When the transmitted optical power is taken with every 0.5 dBm in the range, Table 1 is obtained.

Figure 9:
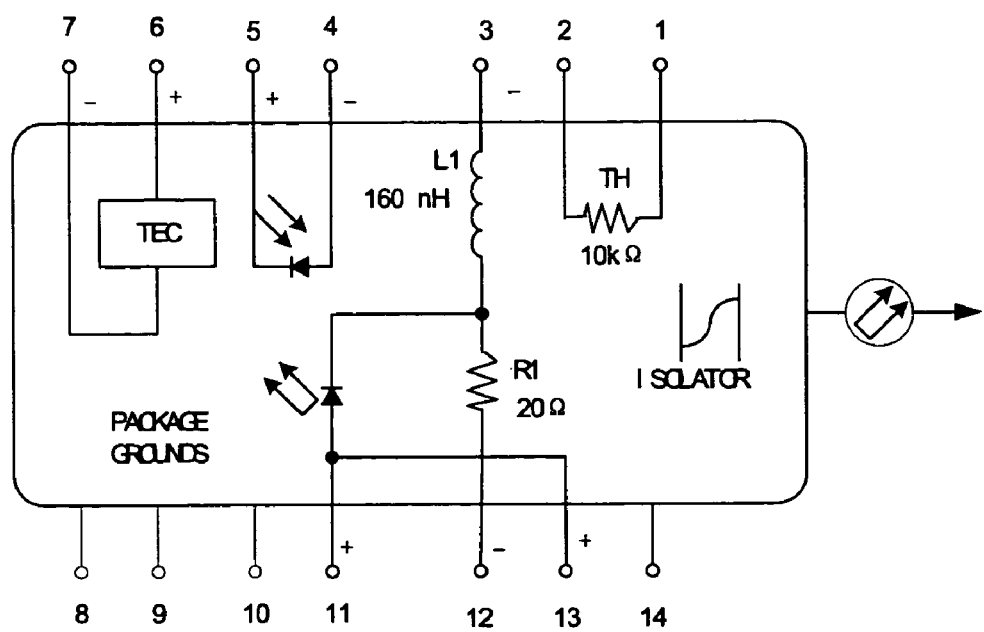
FIG. 9 shows a laser with refrigeration structure.

FIG. 9 shows a direct adjustment laser with refrigeration structure. In this structure TEC is a refrigerating silicon, TH is a heat-sensitive resistance, and a pair of optical transmitter diodes and optical receiver diodes (PIN diodes) are used for optical detection by against light and reporting upward the laser emitting optical power. For a laser with refrigeration, if a bias is provided for the PIN diodes, the optical current is a linear function of the input optical power (mW). Therefore, a curve of analog-to-digital converter (ADC) data function of transmitted optical power can be defined by the two points method used above, and the table for upward reporting transmitted optical power can be created.

Figure 10:
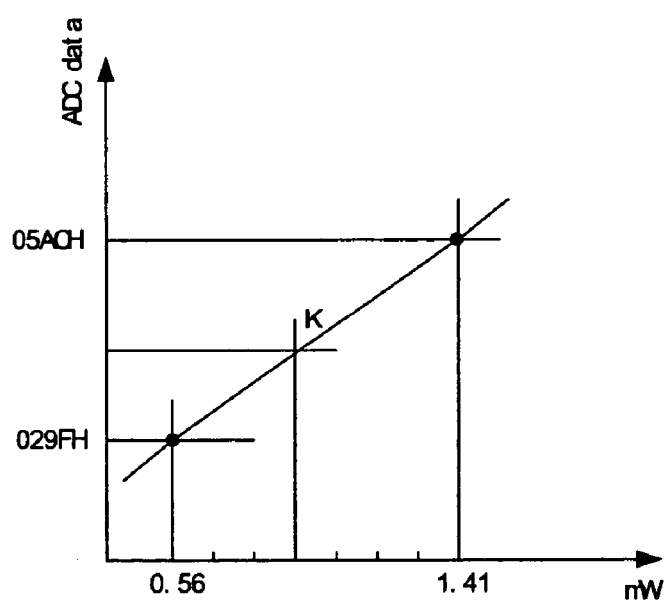
FIG. 10 is a diagram showing how a table for upward reporting transmitted optical power, is created in the invention.

FIG. 10 shows a curve of ADC data function of transmitted optical power. The two points are [0.56 mW (−2.0 dBm), 029FH] and [1.41 mW (1.5 dBm), 05ACH]. From this curve, ADC data corresponding to every expected transmitted optical power can be obtained. When every 0.5 dBm transmitted optical power is taken, the table for upward reporting transmitted optical power (Table 2) can be obtained.

TABLE 2

| Transmitted optical power | Corresponding ADC data |
|---|---|
| −3.0 | 021D |
| −2.5 | 025A |
| −2.0 | 029F |
| −1.5 | 02EC |
| −1.0 | 0342 |
| −0.5 | 03A3 |
| 0.0 | 0410 |
| 0.5 | 048A |
| 1.0 | 0513 |
| 1.5 | 05AC |
| 2.0 | 0658 |
| 2.5 | 071A |
| 3.0 | 07F3 |

Limited by float-point processing capability of CPU and overhead of software, the ADC data of transmitted optical power are obtained by looking up the table and taking linear interpolation.

In the memory, information of an optical transmission module are kept in ASCII characters, mainly including vendor information, type code of the module, produced date, the product sequence number etc.

The module information, such as the exclusive product sequence number, is convenience for management and quality trace; and is written once during production then it is read only and is not modified and deleted.

Figure 11:
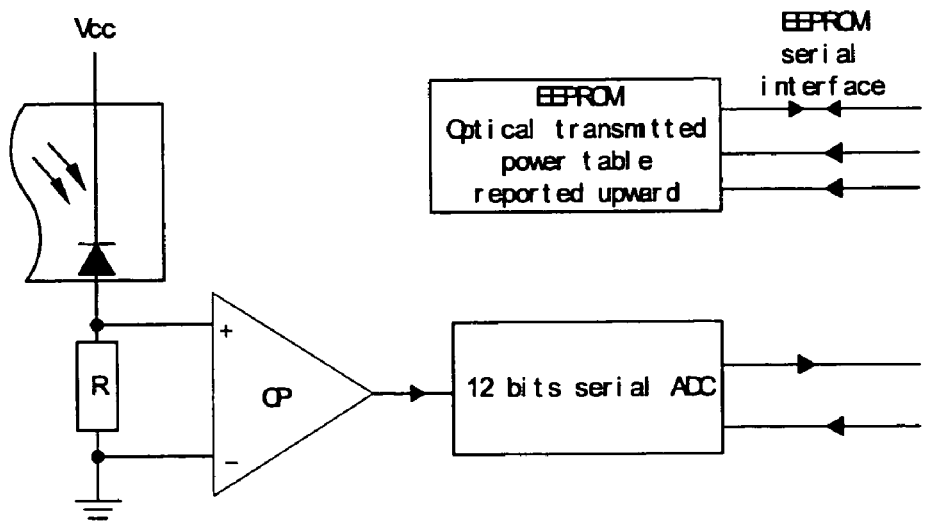
FIG. 11 shows a circuit diagram for upward reporting transmitted optical power.
Figure 12:
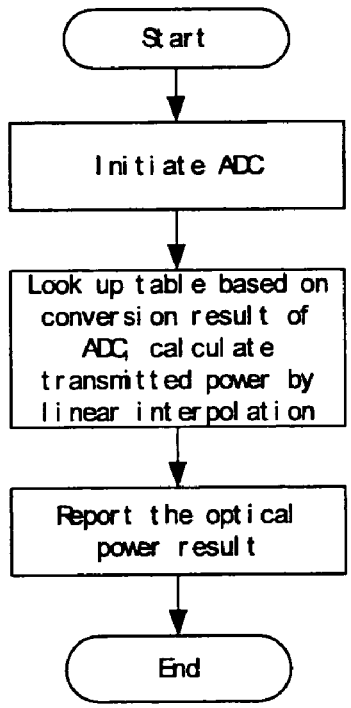
FIG. 12 shows a reporting flowchart for upward reporting transmitted optical power in the invention.

Reference to FIG. 11 and FIG. 12, which show respectively reporting upward principle and procedure of the transmitted optical power. Analog value of a transmitted optical power is detected against by light, and is inputted to ADC after amplified by an operational amplifier. The converted value is a digital data and serially outputted from the serial interface of the ADC. With the data by looking up the table upward reporting transmitted optical power in the EEPROM and taking linear interpolation, a transmitted optical power can be obtained and reported upward through the EEPROM serial interface.

Figure 13:
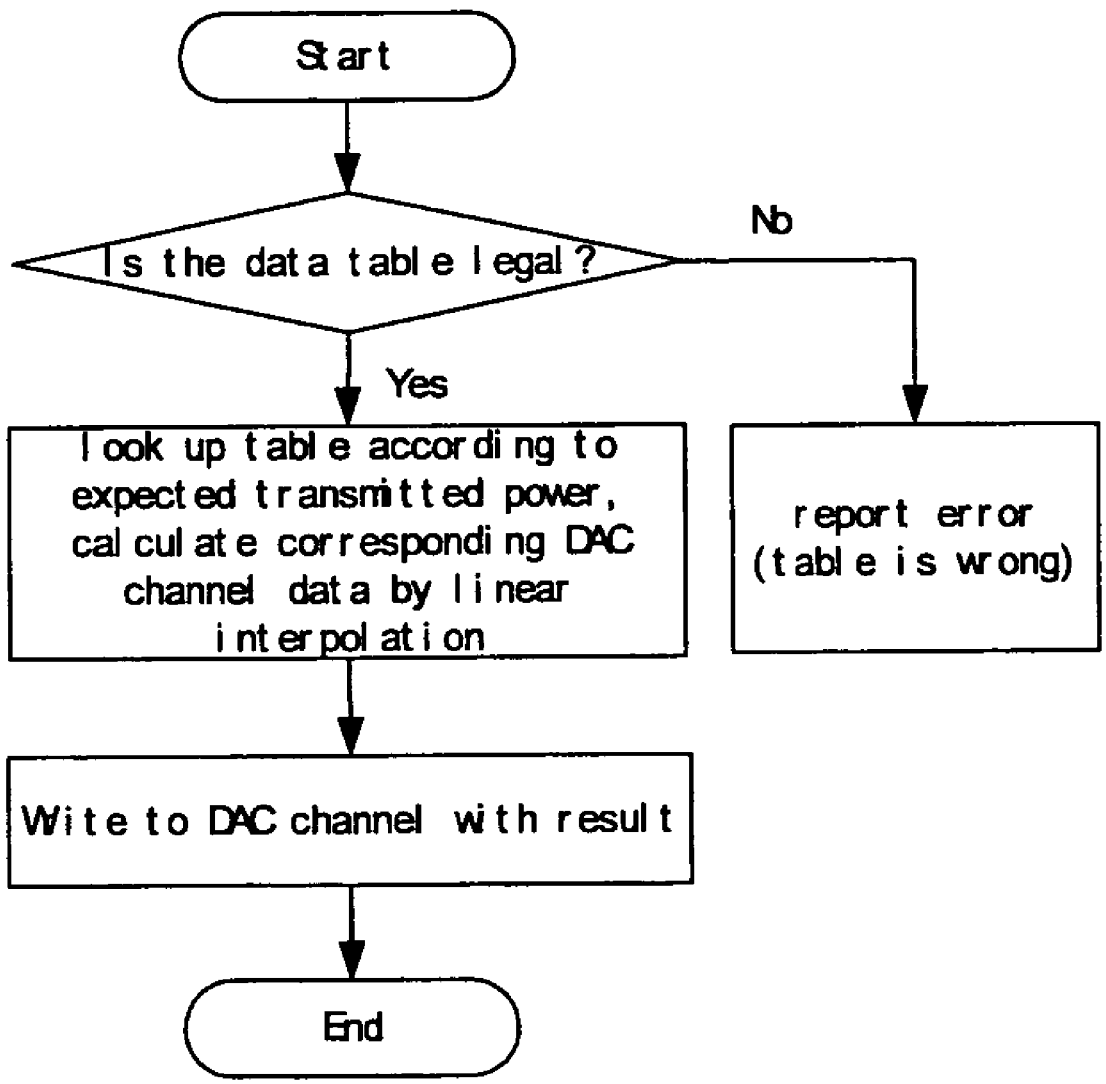
FIG. 13 shows an adjusting flowchart for transmission optical power of an optical transmission module with digital adjustment.

FIG. 13 shows the invention adjustment procedure of transmitted optical power of an optical transmission module that is adjusted digitally. The digital adjustment hardware is a DAC device or a digital adjustment potentiometer. With software, the transmitted optical power and other parameters are continuously adjusted, and implementation steps includes:

Creating a parameter table of the optical transmission module, Table 1, and storing in the memory;

Looking up the table based on an expected transmitted optical power, and taking linear interpolation to obtain the corresponding DAC data;

Writing the DAC data to DAC channel.

Before executing the steps above, whether legitimacy of the table is checked. If reported data is error, the procedure is ended.

By setting a memory in an optical transmission module, the invention implements parameters setting and performance reporting. Through a digital adjustment circuit, parameters and transmitted optical power of an optical transmission module can be adjusted in digital mode.

The method and circuit of the invention have been used in some optical network products and proved that they are reliable and feasible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjusting method for an optical transmission module with digital adjustment, comprising:
   A. setting a memory to store corresponding relation between every preset analog transmitter optical power and laser digital adjustment parameters, wherein the laser digital adjustment parameters comprise a laser extinction ratio adjustment, a laser cross point adjustment, a laser optical power adjustment and a laser optical wavelength trimming;
   B. setting a digital adjustment circuit with digital-to-analog conversion function;
   C. looking up the corresponding relation in the memory, and obtaining the laser digital adjustment parameters according to an expected analog transmitter optical power; writing to digital-to-analog converter (DAC) channel of the digital adjustment circuit; through the digital adjustment circuit, outputting analog signals for adjusting the optical transmission module to obtain the expected analog transmitter optical power.

2. The adjusting method for an optical transmission module with digital adjustment according to claim 1, wherein the step A further comprises, setting the said memory to store a parameter for upward reporting laser transmission optical power, which includes ADC (analog-to-digital converter) data corresponding to every preset transmitted analog optical power;
the method further comprises,
   D. detecting transmitted power of the optical transmission module by against light and converting it to a digital signal;
   E. looking up the parameter for upward reporting laser emitting optical power in said memory according to the digital signal and obtaining a laser emitting optical power value for reporting upward.

3. The adjusting method for an optical transmission module with digital adjustment according to claim 2, in the step C, the step of obtaining the laser digital adjustment parameters further comprises, through linear interpolation based on the corresponding relation, to obtain the said laser digital adjustment parameters;
in the step E, the step of obtaining a laser emitting optical power value for reporting upward further comprises, through linear interpolation based on the parameter for upward reporting laser transmission optical power, to obtain the said laser transmitted power value for reporting upward.

4. The adjusting method for an optical transmission module with digital adjustment according to claim 1, wherein the corresponding relation is stored in an optical transmission module table, in which taking the preset transmitted optical power as an index item, setting other items corresponding to the laser digital adjustment parameters including, the laser extinction ratio adjustment, the laser cross point adjustment, the laser optical power adjustment and the laser optical wavelength trimming.

5. The adjusting method for an optical transmission module with digital adjustment according to claim 4, for the preset transmitted optical power in the parameter table of the optical transmission module, further comprises, setting range of the preset transmitted optical power, which is the index item of the parameter table, from −3.0 dBm to +3.0 dBm with 0.5 dBm space.

6. The adjusting method for an optical transmission module with digital adjustment according to claim 1, creation of the corresponding relation further comprises:
   A1. under a selected first and second laser transmission optical power, adjusting and testing laser parameters of the optical transmission module until that its extinction ratio, cross point and optical wavelength satisfy standards; and then recording first group data and second group data, respectively; wherein each group data including DAC channel data of a optical power, DAC channel data of a extinction ratio, DAC channel data of a cross point and DAC channel data of an optical wavelength;
   B1. taking the laser emitting optical power as abscissa of a coordinate system and taking, respectively, DAC channel data of the optical power, DAC channel data of the extinction ratio, DAC channel data of the cross point and DAC channel data of the optical wavelength as ordinate of the coordinate system;
   respectively identifying data of the first and second group on corresponding coordinate systems according to parameter types, and connecting two points with a linear line on each coordinate system, and then obtaining curves of functions being drawn; wherein functions includes optical power DAC channel data function of the laser transmission optical power, extinction ratio DAC channel data function of the laser transmission optical power, cross point DAC channel data function of the laser emitting optical power and optical wavelength DAC channel data function of the laser transmission optical power;

C1. obtaining the parameter table of the optical transmission module by taking fixed space of the laser emitting optical power on the curves.

7. The adjusting method for an optical transmission module with digital adjustment according to claim 2, wherein the parameter for upward reporting laser emitting optical power is stored in a table for upward reporting laser transmission optical power, which is a table of corresponding analog-to-digital converter (ADC) channel data function of the laser transmission optical power; and range of the said transmitted power is set from −3.0 dBm to +3.0 dBm with 0.5 dBm space.

8. The adjusting method for an optical transmission module with digital adjustment according to claim 2, creation of the parameter for upward reporting laser transmission optical power, further comprises:

A2. under a selected first and second of laser transmission optical power, adjusting and testing upward reporting value of laser emitting optical power in the optical transmission module, respectively; recording corresponding first and second ADC data, respectively;

B2. taking the laser emitting optical power as abscissa and the ADC data of the laser emitting optical power as ordinate of a coordinate system; identifying first and second ADC data on the coordinate system and connecting the said two points with a linear line, and then obtaining a curve of the ADC data function of the laser transmission optical power;

C2. obtaining the table for upward reporting laser emitting optical power by taking fixed space of said transmitted power on curve said above.

9. The adjusting method for an optical transmission module with digital adjustment according to claim 1, wherein the step A further comprises, setting the said memory to store a parameter for information of optical transmission modules.

* * * * *